Nov. 4, 1958  D. A. ROBINSON ET AL  2,858,726
EXPLOSIVELY RELEASABLE NUT HAVING A
WEAKENED LINE OF MATERIAL
Filed Feb. 14, 1955

INVENTORS
DOUGLAS A. ROBINSON
ALAN B. ZIMMERSCHIED
BY
Reynolds, Beach & Christensen
ATTORNEYS United States Patent Office 2,858,726
Patented Nov. 4, 1958

2,858,726

EXPLOSIVELY RELEASABLE NUT HAVING A WEAKENED LINE OF MATERIAL

Douglas A. Robinson, Bellevue, and Alan B. Zimmerschied, Seattle, Wash., assignors to Boeing Airplane Company, Seattle, Wash., a corporation of Delaware Application February 14, 1955, Serial No. 487,988

5 Claims. (Cl. 85—32)

This invention relates to a securing means, and more specifically to a nut, and to the cooperative relationship between such a nut and a threaded bolt which are employed to hold together two or more elements, especially under such circumstances that these two elements are to be held securely and permanently until such time, in an emergency, for example, as it is necessary to permit or effect separation of the elements substantially instantaneously. The bolt may be of standard or conventional form, or of a special form, and only the nut need be of special form. Upon the occurrence of such an emergency an explosive charge is detonated within a closed chamber within the nut, with the result that the nut and the bolt upon which it is threaded are substantially instantaneously disengaged, allowing the elements formerly held together by the same to separate.

Devices to this end are known, and have been used in airplanes, for example, to hold an escape capsule or a canopy over the pilot securely in place under all normal conditions, yet to enable the instantaneous release of the capsule or canopy for escape of the pilot when he must bail out.

In most such devices as heretofore employed, separation of the nut from its bolt has been accomplished in either of two ways. According to one plan, the force of the explosion is sufficient to drive the nut axially off the end of the bolt, stripping the threads in the process of explosive removal of the nut. According to another plan, a line of weakness is provided circumferentially about either the bolt or the nut, where rupture will occur under the force of the explosion, and thereby the so-ruptured parts will be forcibly separated axially. It has been found that the explosive charge, if sufficiently large to effect stripping of the threads, or rupture at the circumferentially weakened line, is also of sufficient force to propel the separated parts forcefully in the general axial direction. This constitutes a very real danger to the pilot, for instance, or to the integrity of equipment, such as the walls of the escape capsule, and for such reasons is highly undesirable. In an attempt to lessen the requisite force, especially where threads must be stripped, the number of turns engaged has been reduced to a minimum, but this has the effect of weakening the normal securement of the elements, and requiring an excessive number of such bolts for effective securement under normal conditions. This adds to the weight and to the cost of the installation, increases the possibility of malfunctioning in an emergency and is otherwise undesirable. The circumferential line of weakening is also somewhat undesirable, as it weakens the strength of the engaged bolt and nut to resist normal forces, and may be the cause of premature failure.

According to the present invention a sleeve-like nut or hollow body, internally threaded to thread upon a securing bolt, and defining with the bolt (and usually with an accompanying plug closing one end of the nut) a closed chamber for the reception of an explosive cartridge or charge that is detonable from the exterior, is formed with a weakened line in the hollow body, extending from end to end, and preferably with only one such weakened line. Such weakened line is of uniform weakness or strength throughout its length. Its strength is ample to prevent rupture under all normal forces, for the forces resisted thereby are almost exclusively axial, hence there is no possibility of accidental failure, and its thread-engaged portion can be of adequate length to insure retention of the secured parts under all normal conditions. It is conveniently provided by grooving the sleeve-like nut from end to end, and preferably along its exterior wall, although this is merely typical of one way in which such a weakened line can be provided.

When the internal explosion occurs, the bursting forces will apply a radial bursting force, sufficient to rupture the hollow body along this weakened line, and will expand the hollow body generally radially, to a sufficient degree that its threads are disengaged radially from the threads of the bolt, and so the bolt may be withdrawn axially without the necessity of stripping threads to any appreciable extent, if at all. The bursting forces may be so calculated with relation to the strength of the weakened line that the ruptured nut or hollow body has its ruptured edges not spread far enough apart that it may be driven off the bolt, transversely to its axis, by the explosive force, with the result that it merely drops harmlessly of its own weight, and then only after axial withdrawal of the bolt. Thus the threaded engagement may be of any length necessary for secure engagement, and resistance of strong axial forces, the number of such securing means may be a minimum, and they may be fairly widely spaced apart, and their cost and weight is, for the same reasons, reduced to a minimum.

The plug which, in the preferred form, threads into and so closes the outer end of the sleeve-like nut, and which contains the explosive cartridge, is formed with an axial bore opening to the closed chamber within the nut, or in some instances such bore constitutes the whole of that closed chamber. The bore walls are subject to the bursting forces, coincidentally with the subjection of the interior walls of the nut to the same bursting forces, with the result that the plug is sufficiently deformed that its threads retain a sufficient degree of engagement with the threads of the nut that separation of the plug from the nut is prevented, and in particular, the plug will not be propelled axially away from the nut.

The present invention has as its object the attainment of such advantages, in a simple, comparatively inexpensive and relatively light weight securing means, of the general character indicated.

With such objects in mind, and others as will appear more fully hereinafter, the present invention comprises the novel nut for cooperation with a threaded bolt, the novel combination of such a nut with a securing bolt, and the novel combination and cooperation of a plug in its threaded engagement within the nut, all as shown in the accompanying drawings and as will be more fully explained in detail hereinafter, and defined in the claims.

In the accompanying drawings the invention is illustrated in several representative embodiments.

Figure 1:
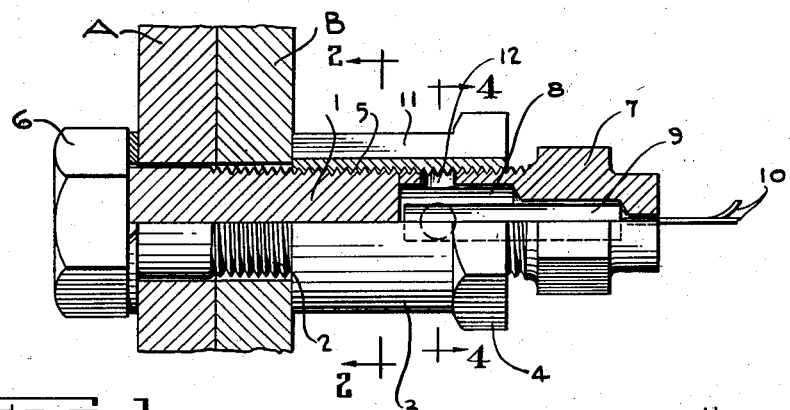
Figure 1 is in part an elevation and in part an axial section through a typical installation of large size, the line of section being along the length of the weakened line of material.
Figure 5:
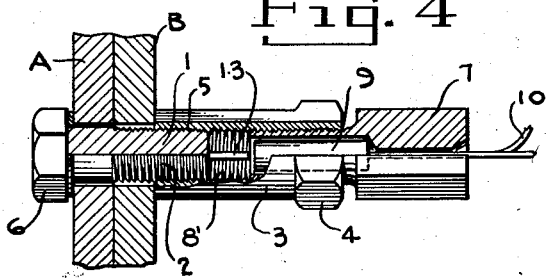
Figure 6:
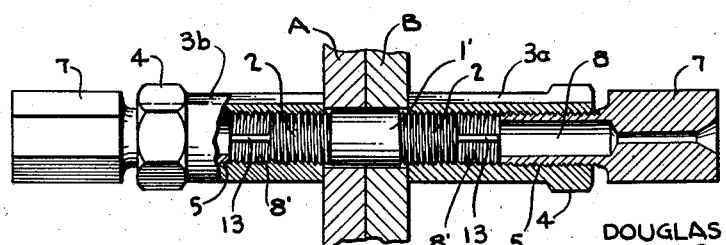

Figure 5 is a view similar to Figure 1, illustrating a somewhat modified and smaller form, with parts in their secured relationship, and Figure 6 is a similar view showing a doubled form.

Two elements A and B are representative of any two, or more, that it may be necessary to secure together permanently until such time as they are to become separable substantially instantaneously. Figure 1 illustrates a bolt having a shank 1, externally threaded at 2, and formed with a head 6, which bears upon the element A, for instance. Such a bolt can be of any standard, conventional or usual construction. The nut which cooperates with such a bolt comprises a hollow and preferably sleeve-like body, generally indicated by the numeral 3, which is preferably externally cylindrical, for the most part, so that its walls are of uniform thickness. Being of one piece of metal, it is therefore of generally uniform strength throughout its walls. It may be provided with a somewhat enlarged polygonal head 4, for engagement by a wrench or like tool, but the length of this head is preferably only a fraction of the length of the hollow body 3, and the cylindrical portion of the hollow body constitutes the greater portion of the length. This hollow body 3 is internally threaded at 5, complementally to the threads 2 of the bolt, and normally fitting the bolt threads in the usual manner of a nut. One end of the hollow body 3, preferably the end distant from its enlarged head 4, bears upon the element B, pressing the elements A and B together between this end of the hollow body 3 and the head 6 of the bolt. Means for positively urging the bolt 1 axially away from the nut, hence to withdraw it from the elements A and B, may be employed, if desired, but have not be illustrated, since in themselves these constitute no part of the present invention.

One purpose in forming the hollow body 3 of some appreciable length is in order to leave within it a chamber. That chamber must be substantially completely closed under normal conditions, and to that end the outer end of the hollow body 3 is closed, preferably by a threaded-in cap or plug 7. Such a plug 7 is itself hollow, to define a chamber 8, within which is received an explosive cartridge or charge 9. Thus the nut 3 defines with its plug 7, in effect, a hollow body which is open at one end and closed at its other end, so as to leave a completely closed chamber 8 that contains an explosive charge. This explosive charge may be fired in the normal way by electrical wires 10 leading to it from an external source of current and through a control switch, neither of which is shown.

The hollow body 3 is weakened, in the form illustrated, by grooving it in a general longitudinal direction, and preferably the groove, indicated at 11, is parallel to the nut's axis. It is preferred that there be only one such groove. This groove is so formed as to leave a weakened wall which is integral with the remainder of the hollow body 3. Since the walls of the nut are of uniform strength throughout, the metal remaining at the bottom of the groove 11 is much weaker, yet is of uniform strength and resistance to bursting throughout its length. The groove extends from end to end of the hollow body 3, and through the enlarged head 4, if there be one.

If the plug 7 is threaded in so far as to engage the end of the bolt 1, as it is shown doing in Figure 1, and in any event if the walls of the plug's bore are of thickness sufficient to resist deformation under the explosive force, it will be desirable to leave apertures 12 leading from the chamber 8 to the inner threaded wall of the nut 3. None of these apertures 12 need be located in registry with the groove 11, as one is shown in Figure 1, for one purpose of using them is to permit access of the explosive force to the inner wall of the nut 3 in proximity to the bolt in order to impose on that wall a bursting force where it surrounds the bolt. Another purpose is to weaken overly strong walls of the plug so that these walls, too, will expand under the force of the explosion, whereby the plug is deformed, and by its deformation is caused to follow approximately the deformation of the nut 3, so that the threaded interengagement between the plug and the nut is not interrupted by the explosion. Thereby the plug is not permitted to separate from the nut, and can not be propelled forcibly from the bolt.

Figure 4:
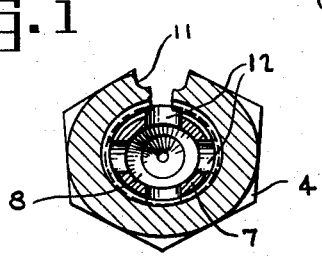
Figure 4 is a transverse sectional view on the line 4—4 of Figure 1, but showing the relationship of the plug to the nut following detonation of the charge.
Figure 2:
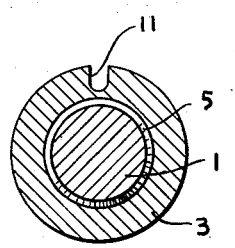
Figure 2 is a transverse sectional view substantially on the line 2—2 of Figure 1, showing the parts in their normal secured relationship.
Figure 3:
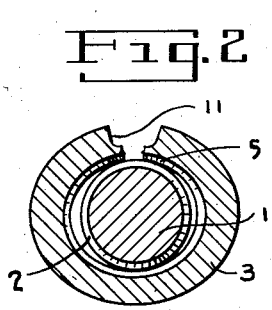
Figure 3 is a similar view of the parts following detonation of the charge, showing the nut ruptured and the nut and bolt in the relation for axial separation.

When it is necessary to separate the elements A and B a current is passed along the leads 10, the cartridge 9 is detonated, and the force of the explosion is applied to the interior walls of the plug 7 and through those walls, and also somewhat more directly through the apertures 12, to the interior walls of the nut 3. The greatest force of the explosion is concentrated close to the bolt. Since this nut has been weakened along the line of the groove 11, the nut will rupture from end to end along this line of weakening, and the force of the explosion may be calculated to be sufficient to open up a gap and to spread the nut 3 radially to a sufficient extent, as is shown in Figure 3, to remove the threads 5 radially from appreciable engagement with the threads 2. The force of the explosion can be regulated further to an extent that the spreading apart of the ruptured edges will not be sufficient that the nut 3 can be driven radially off the shank 1. In other words, the ruptured gap will be always less than the diameter of the bolt's shank. In consequence the opening up of the nut is always sufficient to disengage the threads 5 from the threads 2, and thereby to permit axial separation of the nut and bolt, but is never sufficient that the nut can be driven radially off the bolt. Since the walls of the plug's internal chamber 8 are expanded by the explosive force, particularly in the region weakened by the apertures 12, so that the plug remains threadedly engaged to an appreciable degree with the nut 3, these two members will not separate, and in Figure 4 they are shown expanded but still engaged.

In the form shown in Figure 5 a spacer 13 is interposed between the end of the bolt 1 and the end of the plug 7. This serves in lieu of the apertures 12 to afford access of the force of the explosion directly to the interior wall of the hollow body 3, and so to insure radial expansion of the nut in the region close to the bolt. In this instance the interior chamber 8' is constituted largely in the space left by the spacer 13, yet the walls of the plug are sufficiently thin that they will expand under the force of the explosion, to retain threaded engagement with the nut, as before. In the form shown the spacer 13 is formed upon the end of the bolt 1, modifying the standard bolt to this extent.

In the form shown in Figure 6 a central shank 1' is formed without a head, and two nuts 3a and 3b are threaded upon the opposite ends of the shank 1', and each contains an explosive charge. The spacer 13 is employed at the two ends of the bolt 1'. Either such nut serves in lieu of the head 6 of the bolt.

We claim as our invention:

1. A nut for cooperation with a threaded bolt for joining at least two elements securely until such time as they are to be separable substantially instantaneously, comprising a sleeve of substantially uniform thickness throughout, internally threaded from end to end, for threaded interengagement with the threads of such a bolt, a skirted plug closed at one end, and threadedly engaged at its other end within the end of the sleeve, to close the same and to define an interior chamber of which the plug's skirt is at least a part, and which is closed when the nut is applied to the bolt, an explosive charge received within said chamber and detonable from without the same, said sleeve being formed as one piece of metal of generally uniform resistance to bursting, except for a weakened line of material extending from end to end of the sleeve, and the plug's skirt being apertured for direct access of radial bursting forces directly to the interior wall of said sleeve.

2. A nut, plug, and explosive charge in combination, as defined in claim 1, including a spacer disposed intermediate that end of the plug which in use is nearer the bolt, and the end of the bolt, to afford direct access of the explosive force to the interior wall of the nut.

3. An explosively releasable element for retentive securement upon the threaded shank of a bolt, said element comprising a hollow body of substantially uniform wall thickness throughout, internally threaded, an end-closure element threadedly engaged therein to close said hollow body at one end, said hollow body being threadedly engaged at its opposite end with the entire exposed length of the bolt's threads, and of a length that when so engaged it defines a chamber between the end of the bolt and the closed end of said hollow body, an internal skirt on said end-closure element of a length to engage the end of the bolt, as a spacer, an explosive charge received within said chamber, said skirt being perforated for direct access of radial bursting forces to the interior wall of the hollow body, and said hollow body being formed with a longitudinally directed groove along its exterior, extending from end to end and leaving the wall of substantially uniform thickness along the bottom of the groove, whereby upon detonation of the charge the resultant radial stresses split the wall of the hollow body along the entire line of the groove, for radial disengagement of the threads of the hollow body from the threads of the bolt.

4. A nut for cooperation with a threaded bolt for joining separable elements securely until such time as they are to be separated substantially instantaneously, comprising a sleeve of substantially uniform thickness throughout, internally threaded from end to end, for threaded engagement with the threads of such a bolt, a plug closed at one end, and formed with an externally threaded skirt at its other end, threadedly received within the end of the sleeve, to close the same and to define a closed interior chamber, a spacer of a form which allows direct access of an explosive force to be applied to the interior of the sleeve, disposed intermediate the bolt end and the skirt's end, within such chamber, an explosive charge received within the chamber and detonable from without the same, and upon its detonation applying a bursting force to the interior of the sleeve, at least in that portion exposed by the spacing apart of the sleeve and skirt, said sleeve being formed as one piece of metal of generally uniform resistance to bursting, except for a weakened line of material extending from end to end of the sleeve.

5. The combination of claim 4, wherein the sleeve is exteriorly grooved lengthwise, along its exterior, to define a weakened wall of substantially uniform thickness between its interior surface and the bottom of the groove, for yielding under bursting stress, and constituting the weakened line of material.

References Cited in the file of this patent

UNITED STATES PATENTS

| | | |
|---|---|---|
| 414,519 | Gladding | Nov. 5, 1889 |
| 2,362,738 | Yarbrough | Nov. 14, 1944 |
| 2,556,672 | Bergh | June 12, 1951 |
| 2,653,504 | Smith | Sept. 29, 1953 |

FOREIGN PATENTS

| | | |
|---|---|---|
| 875,292 | France | June 15, 1942 |